Jan. 8, 1952  G. C. WEINGARDT  2,581,891
WINDOW RETAINING MEANS
Filed Dec. 13, 1946
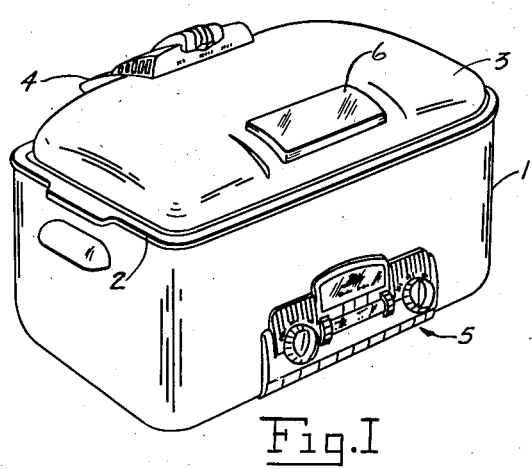
Fig. I
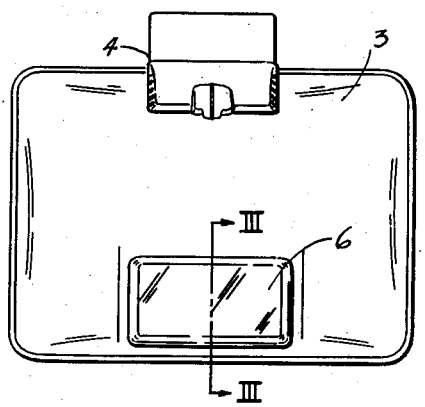
Fig. II
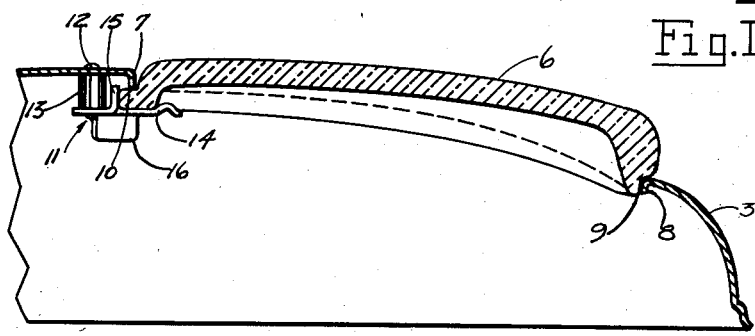
Fig. III
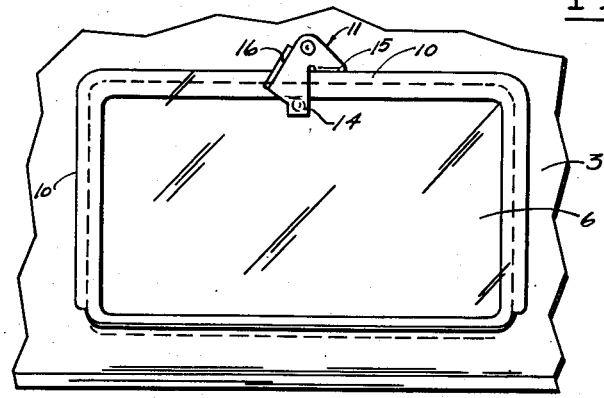
Fig. IV
INVENTOR.
GEORGE C. WEINGARDT
BY
Marshall and Marshall
ATTORNEYS Patented Jan. 8, 1952

2,581,891

UNITED STATES PATENT OFFICE 2,581,891

WINDOW RETAINING MEANS

George C. Weingardt, Toledo, Ohio, assignor, by mesne assignments, to Tropic-Aire, Inc., Chicago, Ill., a corporation Application December 13, 1946, Serial No. 715,972

2 Claims. (Cl. 189—78)

This invention relates to window retaining means and, more particularly, to a simple retaining means for a viewing window set into an otherwise opaque cover or lid, for example. The invention has been particularly designed for employment in the cover of a domestic electrically heated food roaster.

A housewife preparing food in such a roaster often wishes to look at the food being prepared to determine whether or not there is a sufficient amount of water in the pan to prevent burning or whether or not the roast or other food being prepared is ready for consumption. Ordinarily this would require that the cover on the roaster be lifted so that the food could be viewed but this is objectionable because of the quantities of steam which at once escape from the roaster and may scald the hands or face of the person desiring to look into the roaster. This danger of scalding may be obviated by providing a viewing window in the roaster lid.

A window of this type should be easily removable to permit its being washed regularly to clean it of fats and greases that may be deposited on the inner surface of the window and dust or dirt that may fall on the exterior surface of the window. The window, however, should tightly fit in the cover to prevent the escape of steam and moisture around its edges.

It is an object of this invention to provide a simple positive quick acting window retaining means for holding a small viewing window in an opaque cover.

In the drawings:

Figure I is a perspective view of a domestic electrically heated food roaster equipped with a viewing window.

Figure II is a plan view of the roaster shown in Figure I.

Figure III is a fragmentary vertical sectional view on an enlarged scale taken substantially on the line III—III of Figure II.

Figure IV is a fragmentary view in elevation taken from the interior of the roaster cover, i. e. from beneath Figure III and shown on a slightly reduced scale.

The electrically heated roaster shown in Figure I comprises among other parts a housing 1 in which may be inserted an electrically heated liner and a food holding pan 2. The roaster has a cover 3 which is hinged at its rear by a hinge 4 to the housing 1. A control panel 5 located on the forward wall of the housing 1 may contain various controls for temperature, for lifting the cover and for turning the roaster on and off.

The cover 3 is equipped with a viewing window 6 to permit the housewife to view the food in the roaster while it is being cooked. The window 6 is located in a substantially rectangular opening 7 stamped or otherwise cut in the cover 3. The opening 7 has a downwardly extending lip 8 running all the way around its edge. The window 6 is molded with an undercut recess 9 along its lower front edge and a horizontal flange 10 on its other three edges. The undercut recess 9 fits the lip 8 along the forward edge of the window 7 and the flange 10 rests against the lowermost edge of the lip 8 at the two sides and rear edge of the opening 7. The window glass 6 is held up in position by means of a retaining clip 11 which is pivoted to swing horizontally on a rivet 12 fixed in the cover 3 and is spaced on such rivet by a cylindrical spacer 13. The clip 11 has one horizontally extending arm 14 which passes beneath the edge of the flange 10 of the glass 6, a second arm 15 which is turned upwardly and adapted to engage against the rear edge of the flange 10 and a third arm 16 which is turned downwardly and can be grasped between the thumb and forefinger to rotate the clip 11 in a counterclockwise direction (Figure IV) to disengage its arm 14 from beneath the flange 10.

To insert the window 6 in place the clip 11 is rotated until its arms extend away from the opening 7. The glass 6 is then inserted from beneath into the opening 7 and moved forwardly until its recess 9 registers with the forward edge of the opening 7 and the lip 8. The window 6 then can be pushed upwardly until its flange 10 engages with the lower edge of the lip 8 at the rear of the opening 7 and the clip 11 then rotated to swing its retaining arm 14 beneath the flange 10 of the glass 6. Removal of the glass 6 consists of a reversal of these steps.

This construction affords a simple, secure and quickly releasable lock for retaining the window 6 in place. The cooperation between the molded edges of the window 6 and the edges of the opening 7 holds the window against all movement other than a counterclockwise pivoting downwardly with the recess 9 as a pivot and this is prevented by the clip 11. The arm 14 of the clip 11 is resilient so that it presses tightly against the glass 6 thus holding the glass 6 tightly against the lip 8 all around the edges of the opening 7 and preventing rattling or the escape of moisture and steam from the interior of the roaster.

The embodiment of the invention which has been described may be modified to meet various requirements.

Having described the invention, I claim:

1. Means for retaining a molded window glass in an opening in a member comprising, in combination, a convex lip along one side of the opening in said member, a concave complementary groove undercut in one edge of said glass, an underlying flange on at least two of the other edges of said glass and a movable resilient latch mounted on the member and engageable over the flange on the side of said glass opposite said groove for holding said flange against said lip.

2. Means for retaining a rectangular molded window glass in an opening in a member comprising the combination of a convex lip along one side of the opening in said member, a concave inwardly extending undercut groove formed in one edge of said glass, and underlying flange on the other edges of said glass and a movable resilient latch mounted on the member and engageable behind the flange on the side of said glass opposite the side having said undercut groove, whereby said groove and latch prevent movement of said glass in one direction generally perpendicular to the plane of said glass and said flange prevents movement of said glass in the opposite direction.

GEORGE C. WEINGARDT.

REFERENCES CITED

The following references are of record in the file of this patent:

UNITED STATES PATENTS

| Number | Name | Date |
|---|---|---|
| 248,808 | Spicer | Oct. 25, 1881 |
| 820,394 | Cutler | May 15, 1906 |
| 1,154,430 | Possons | Sept. 21, 1915 |
| 2,149,385 | Bendele | Mar. 7, 1939 |
| 2,325,773 | Hennessy | Aug. 3, 1943 |
| 2,419,287 | Rudy | Apr. 22, 1947 |
| 2,453,343 | Reilly | Nov. 9, 1948 |